United States Patent Office 3,216,194
Patented Nov. 9, 1965

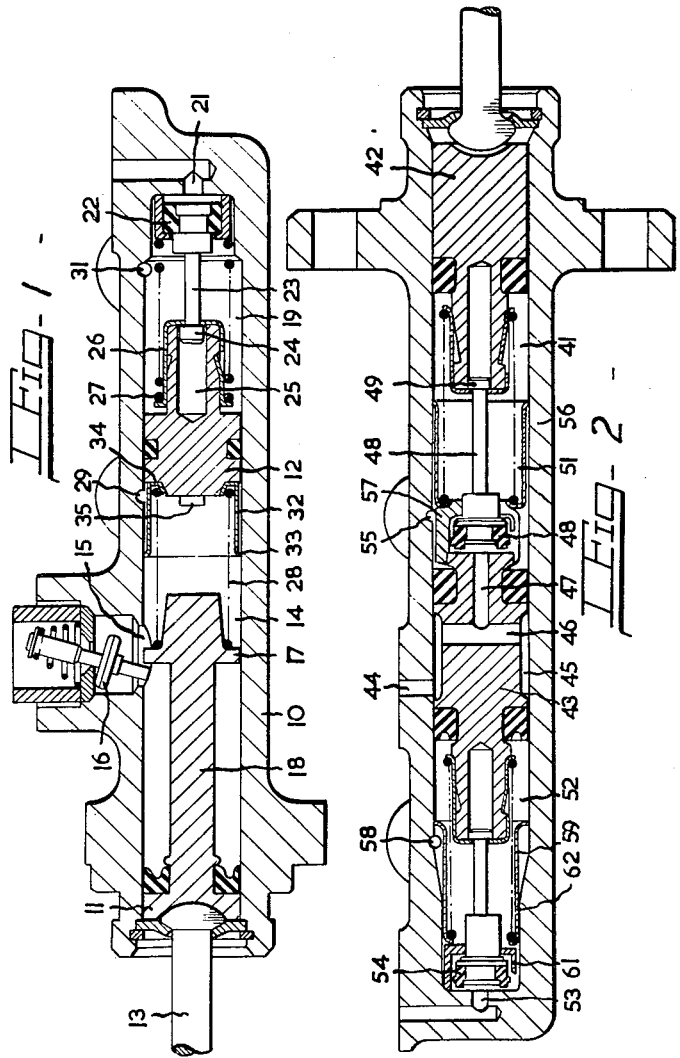

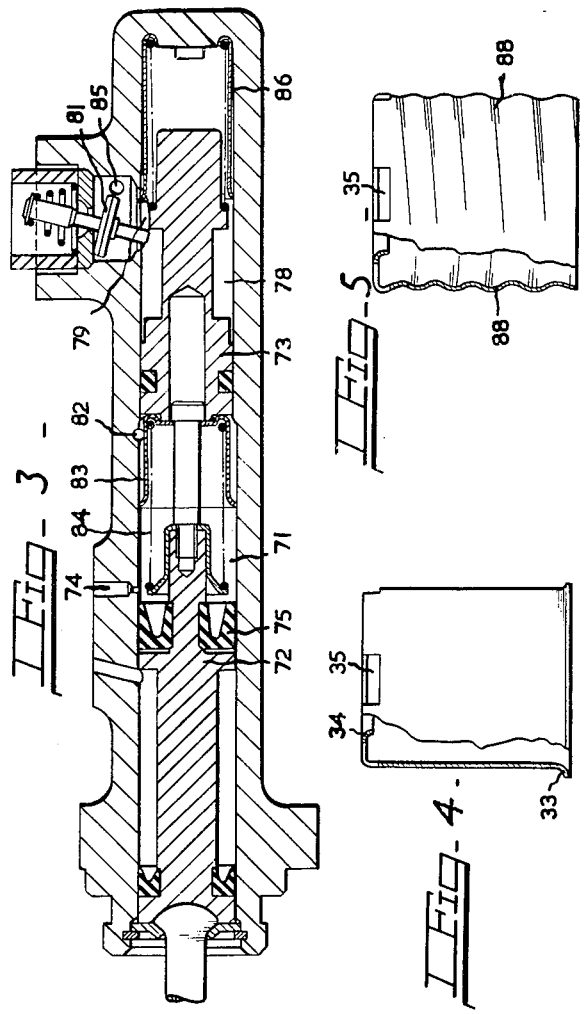

3,216,194
MASTER CYLINDERS FOR HYDRAULIC
BRAKING SYSTEMS
Alfred Yardley, Blackheath, England, assignor to Girling
Limited, Birmingham 11, England, a British company
Filed Sept. 25, 1963, Ser. No. 311,394
Claims priority, application Great Britain, Sept. 25, 1962,
36,348
5 Claims. (Cl. 60—54.6)

This invention relates to improvements in master cylinders for hydraulic braking systems for vehicles.

The usual hydraulic braking system comprises a master cylinder in which works a pedal or booster operated main piston with or without a floating secondary piston, a reservoir for working liquid with which the master cylinder is in communication in the off position of the brake, and slave or wheel cylinders connected to a pressure space or pressure spaces in the master cylinder by pipe lines.

The various components are assembled on a vehicle in the course of construction and are filled with hydraulic liquid subsequently, and in filling the system with liquid it is essential that all air should be eliminated as far as possible.

Where the master cylinder is mounted with its axis horizontal or substantially so air can escape from the cylinder into the reservoir through the usual valve or valves which connect the pressure space or spaces in the cylinder to the reservoir and are open when the main piston is in the fully retracted position.

However there is an increasing tendency for master cylinders to be mounted with their axes vertical or inclined at only a small angle to the vertical and this increases the difficulty of bleeding the cylinder effectively when the system is being filled with liquid.

According to our invention this difficulty is overcome or mitigated by incorporating in a pressure space of a master cylinder a passage connecting the outlet port to point or space adjacent to the end wall of the pressure space which is uppermost when the master cylinder is installed.

In a single-piston master cylinder the end wall of the pressure space will be the end wall of the cylinder itself, while in a tandem master cylinder the end wall of the pressure space between the main and secondary pistons will be formed by the secondary piston.

The passage between the outlet port and the uppermost end wall of a pressure space is conveniently formed by a flexible plastic sleeve which is of less diameter than the bore of the cylinder and has at one end an outwardly turned lip or flange which is in light sealing engagement with the cylinder wall. The other end of the sleeve has an inturned annular flange which is held in engagament with the end wall of the pressure space, and circumferentially spaced holes through which air and liquid can flow are formed in the sleeve at this end. The outlet port is located between the ends of its sleeve and leads out of the anular space between the sleeve and the cylinder wall.

Where the end wall of the pressure space is one end wall of the cylinder the sleeve is conveniently held against it by a compression spring abutting between the inturned flange on the sleeve and the main piston or secondary piston, the sleeve having no axial movement.

In a tandem master cylinder where the end wall of the pressure space between the pistons is formed by the secondary piston the inturned flange on the sleeve is conveniently held against the secondary piston by the usual compression spring between the pistons. The sleeve moves axially with the secondary piston but is of sufficient length to ensure that the outlet port is always in communication with the annular space between the sleeve and the cylinder wall.

Three forms of master cylinder incorporating our invention are illustrated by way of example in the accompanying drawings in which:

FIGURE 1 is a longitudinal section of one form of master cylinder;

FIGURE 2 is a similar section of another form of master cylinder;

FIGURE 3 is a similar section of a third form of another cylinder; and

FIGURES 4 and 5 are side elevations partly broken away of two forms of sleeve.

FIGURE 1 shows a tandem master cylinder 10 in which work a main piston 11 and a secondary or floating piston 12. The piston 11 is advanced to apply the brakes by a push-rod 13 which may be actuated by a pedal or by a booster. A first pressure space 14 between the pistons is in communication with a reservoir (not shown) through a port 15 controlled by a spring-loaded tipping valve 16 of known type which is held in the open position shown in the drawing by a radial flange 17 on a forward extension 18 of the piston 11 when the piston is in the fully retracted position. A second pressure space 19 between the secondary piston 12 and the forward end of the cylinder communicates with a reservoir through a port 21 in the end of the cylinder controlled by an axial valve 22 of known type coupled to the piston 12 by an axial stem 23 having a head 24 slidably engaged in an axial recess 25 in the piston in which it is retained by a flanged clip 26.

The piston 12 is urged towards the retracted position by a compression spring 27 and the main piston 11 is urged towards the retracted position by a spring 28 located between the pistons.

Fluid under pressure is supplied from the pressure space 14 to the slave cylinders of the brakes on one pair of wheels of the vehicle through an outlet port 29 in the wall of the cylinder which is located immediately behind the position occupied by the rear end of the secondary piston 12 when it is in its fully retracted position.

Fluid under pressure is supplied from the second pressure space 19 to the slave cylinders of the brakes on another pair of wheels through an outlet port 31 located adjacent to the forward end of the cylinder.

Located in the pressure space 14 over the outlet port 29 there is a flexible plastic sleeve 32 which is of substantial length and is of less diameter than the bore of the cylinder. At its rear end the sleeve has an outwardly turned annular lip or flange 33 which is in light sealing engagement with the cylinder wall. The other end of the sleeve has an inturned annular flange 34 which is held in engagement with the rear end of the piston 12 by the spring 28, and circumferentially spaced slots or holes 35 (seen more particularly in FIGURES 4 and 5) through which air and liquid can flow are formed in the sleeve at this end. The outlet port 29 is located adjacent to the forward end of the sleeve and the sleeve is of sufficient axial length to ensure that as the secondary piston moves forwardly and takes the sleeve with it the port 29 is always in communication with the annular space between the sleeve and the cylinder wall.

The master cylinder is commonly mounted in a vehicle with the axis of the cylinder substantially vertical and its right hand end uppermost. When the system is being filled initially with liquid the liquid is fed from the reservoir or reservoirs through the valves 16 and 22 which are then open until the pressure spaces 14 and 19 are full. The main piston 11 is then advanced so that the valve 16 closes and the forward movement of the piston 11 through the spring 28 advances the secondary piston 12 so that the valve 22 closes. Pressure builds up in both spaces and increased force applied to the main piston forces liquid from the pressure spaces to the slave cylinders where air is bled off. Any air in the pressure space 19 can flow out though the port 21 to the reservoir when the valve 22 is open and through the outlet port 31 to the slave cylinders when the valve is closed, the outlet port being close to the upper end of the pressure space.

However in the case of the pressure space 14 air can accumulate above the port 15 leading to the reservoir and when the secondary piston has been advanced air below the piston but above the outlet port 29 would be trapped but for the presence of the sleeve 32. With the sleeve in position the air is forced through the openings 35 at the upper end of the sleeve and so by way of the annular space between the sleeve and the cylinder bore into the outlet port 29 from which it passes into the slave cylinders where it is bled off.

In the modified form of master cylinder shown in FIGURE 2 the first pressure space 41 between the main piston 42 and the secondary piston 43 communicates with a port 44 leading to a reservoir through an annular groove 45 in the secondary piston, a transverse passage 46, and an axial passage 47 which is controlled by a valve 48 which is similar to the valve 22 in FIGURE 1. The valve is coupled by a stem 48 and head 49 to the main piston and a compression spring 51 is located between the pistons.

The second pressure space 52 in front of the secondary piston communicates with the same or another reservoir through a port 53 in the end of the cylinder controlled by a valve 54 coupled to the secondary piston.

An outlet port 55 through which liquid is forced from the pressure space 41 is located in the wall of the cylinder immediately behind the secondary piston and a sleeve 56 similar to the sleeve 32 shown in FIGURE 1 is held by the spring 51 against the rear end of the cage 57 of the valve 48.

The outlet port 58 from the pressure space 52 is located within a sleeve 59 which is held against the cage 61 of the valve 54 by a spring 62.

The function of these sleeves is the same as that of the sleeve 32 in FIGURE 1.

In the master cylinder shown in FIGURE 3 the first pressure space 71 between the main piston 72 and the secondary piston 73 communicates with a reservoir through a port 74 in the cylinder wall which is closed by a cup seal 75 on the main piston when the piston is advanced to apply the brake. The second pressure space 78 between the secondary piston and the forward end of the cylinder communicates with the same or another reservoir through a passage 79 controlled by a spring-loaded tipping valve 81 which is held in the open position by the secondary piston when the piston is in the fully retracted position and closes automatically as the piston is advanced. The outlet from the first pressure space comprises a port 82 in the cylinder wall immediately behind the secondary piston and located within a sleeve 83 which is held in engagement with the secondary piston by a compression spring 84 located between the pistons.

The outlet from the second pressure space 78 comprises a port 85 located in the passage 79 below the tipping valve. A sleeve 86 is located in the front part of the pressure space 78 and the flange at its front end is held against the front end of the cylinder by a spring 87 which urges the secondary piston towards the retracted position, while the rear end of the sleeve extends slightly beyond the opening in the cylinder wall leading into the passage 79 so that air entering the annular space between the sleeve and the cylinder wall is fed rearwardly into the port 85.

A sleeve of the form used in the master cylinder shown in FIGURES 1, 2 and 3 is shown in detail and on a larger scale in FIGURE 4. An alternative form of sleeve is shown in FIGURE 5. In this sleeve the outwardly turned lip 33 which spaces the sleeve from the cylinder wall is omitted and the sleeve is substantially the same diameter as the cylinder bore but the wall of the sleeve is formed with a continuous helical groove 88 providing a passage for air between the outer surface of the groove and the cylinder wall.

This arrangement has the advantage that it avoids any risk of the passage for air being blocked through an intermediate portion of the length of the sleeve being forced by fluid pressure against the cylinder wall.

I claim:

1. A master cylinder for an hydraulic braking system comprising a cylinder, at least one piston axially movable in the cylinder to apply pressure to liquid in a pressure space in the cylinder between said piston and an end wall, means establishing communication between the pressure space and a reservoir in the fully retracted position of the piston, an outlet port in the cylinder wall within said pressure space adapted to be connected to a slave cylinder for actuating a brake, and axially extending liquid conducting means located in the pressure space between said piston and said end wall and providing a passage connecting said outlet port at all times to a point adjacent to said end wall.

2. A master cylinder for an hydraulic braking system comprising a cylinder, at least one piston axially movable in the cylinder to apply pressure to liquid in a pressure space in the cylinder between said piston and an end wall, means establishing communication between the pressure space and a reservoir in the fully retracted position of the piston, one outlet port in the cylinder wall within said pressure space adapted to be connected to a slave cylinder for actuating a brake, and a sleeve located in said pressure space and held against said end wall, said sleeve providing between itself and the wall of the cylinder a longitudinal passage extending between the end wall and the outlet port.

3. A master cylinder as in claim 2 wherein said sleeve is of less diameter than the cylinder bore and has at one end an inwardly turned annular first flange adapted to be held in engagement with the end wall of the pressure space and has at the other end an outwardly directed second flange adapted to bear on the cylinder wall and to space the sleeve from said wall, openings being formed in the wall of the sleeve adjacent to said first flange.

4. A master cylinder as in claim 2 wherein said sleeve is of a diameter substantially equal to that of the cylinder bore and has at one end an inturned annular flange adapted to be held in engagement with the end wall of the pressure space, and the wall of the sleeve has formed in it a helical groove providing a continuous passage extending between the outlet port and openings in the wall of the sleeve adjacent to the said flange.

5. A master cylinder for an hydraulic braking system comprising a cylinder, a main piston axially movable in the cylinder, a secondary floating piston axially movable in the cylinder, a pressure space in the cylinder between said pistons, means establishing communication between the pressure space and a reservoir in the fully retracted position of the main piston, an outlet port in the cylinder wall within said pressure space adapted to be connected to a slave cylinder for actuating a brake, and a sleeve located in the pressure space and held against the rear end of the secondary piston, said sleeve providing between itself and the wall of the cylinder a longitudinal passage extending between the secondary piston and the outlet port and being of sufficient axial length to ensure that said outlet port is in communication with said longitudinal passage in any position of the secondary piston.

References Cited by the Examiner

UNITED STATES PATENTS

| 2,156,205 | 4/35 | Swift | 60—54.6 |
| 2,246,141 | 6/41 | Main | 60—54.6 |
| 2,325,284 | 7/43 | Swift | 60—54.6 X |
| 2,954,675 | 10/60 | Reynolds | 60—54.6 |

FOREIGN PATENTS

| 872,682 | 2/42 | France. |

JULIUS E. WEST, *Primary Examiner.*

EDGAR W. GEOGHEGAN, *Examiner.*